United States Patent Office 3,799,909
Patented Mar. 26, 1974

3,799,909
METHOD OF CURING EPOXY RESINS USING N-AMINOALKYLPHTHALAMIDES
Robert S. Taylor, Livermore, Calif., assignor to Hexcel Corporation, Dublin, Calif.
No Drawing. Original application Apr. 26, 1971, Ser. No. 137,673, now Patent No. 3,704,090. Divided and this application Aug. 21, 1972, Ser. No. 282,089
Int. Cl. C08g 30/14
U.S. Cl. 260—47 EN        5 Claims

ABSTRACT OF THE DISCLOSURE

Aromatic dicarboxamide diamines are provided for use as aqueous rust inhibitors or temperature controlled curing or cross-linking agents for polymers having amine reactive functionalities, e.g. epoxy resins and polyisocyanate resins.

---

This is a division of application Ser. No. 137,673, filed Apr. 26, 1971, now Pat. No. 3,704,090.

BACKGROUND OF THE INVENTION

Field of the invention

In many uses of water, where water is used as a cooling agent, it is frequently continuously recycled. Because of the repetitive use, it has become advantageous to add a wide variety of additives to the water. A number of these additives include rust inhibitors, fungicides, bacteriocides, etc.

Satisfactory additives are those which are stable under the conditions under which the water is employed, or if they degrade, degrade to compounds with substantially the same or greater activity. The additives themselves must not induce deleterious side effects, so that in curing one problem, an additional problem is created. Furthermore, the additives should be effective at extremely low concentrations, so as to require only small amounts of material to obtain the desired protection.

Quite distinct from the above field, is the use of materials as cross-linking or curing agents with polymers which retain active functionalities. With many epoxy resins or polyurethanes or ureas, a prepolymer is formed of moderate molecular weight. The prepolymer is then combined with a cross-linking or curing agent so as to provide high molecular weight polymers having the desired physical properties. In many applications, it is necessary that the compound be relatively unreactive at ambient temperatures, so that the curing compound and prepolymers may be mixed and allowed to stand for long periods of time prior to use, and be reactive at elevated temperatures, so as to provide a short cure time. Numerous compounds have been employed in this way providing varying degrees of temperature control.

Description of the prior art

The preparation of N,N'-bis(2-aminoethyl)terephthalamide by a relatively exotic procedure may be found in Japanese Pat. No. 15,925 and Natsuo, Nippon Kagaku Zasshi, 1960, 89 (8), 780–4. The method employs a nitrile, ethylenediamine, sulfur and water. U.S. Pat. No. 2,371,104 refers generically to alkylenediamine amides of dicarboxylic acids. Their use is for dyeing and printing assistance. U.S. Pat. No. 3,326,853 teaches the use of aminoamides as curing agents for epoxy resins.

SUMMARY OF THE INVENTION

N,N'-di(aminoalkyl)substituted monocyclic aromatic dicarboxamides find use as rust inhibitors in aqueous media and as temperature controlled cross-linking or curing agents for polymers having amine reactive functionalities.

DESCRIPTION OF THE SPECIFIC EMBODIMENTS

The compositions which find use in this invention, have one or more compounds of the following formula:

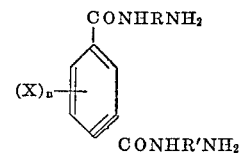

wherein R and R' are alkylene of from 2 to 3 carbon atoms, there being at least 2 carbon atoms between the amine nitrogen atoms, the two monoxocarbonyl groups being separated by at least three annular carbon atoms (meta or para), preferably 4 annular carbon atoms (para); X is halogen of atomic number 9 to 53 (fluorine, chlorine, bromine or iodine) or alkyl of from 1 to 4 carbon atoms; and $n$ is 0 to 2, preferably 0. R and R' may be ethylene, 1-methylethylene or propylene.

Illustrative compounds include

N,N'-bis(2-aminoethyl)isophthalamide;
N,N'-bis(3-aminopropyl)terephthalamide;
N,N'-bis(2-aminopropyl)-isophthalamide;
N,N-bis(2'-aminoethyl)-2-chloroterephthalamide;
N,N'-bis(2'-aminoethyl)-4-tert-butyl isophthalamide;
N,N'-bis(2'-aminoethyl)-2-fluoroterephthalamide;
and N,N'-bis(3-aminopropyl)isophthalamide; and
N,N'-bis(2'-aminoethyl)-difluoroterephthalamide.

The compounds can be readily prepared by employing the lower alkyl esters, for example, the methyl ester, of the desired acid and mixing it with a large excess of the alkylene diamine. At least about a 5-fold excess over stoichiometric will be used and as high as a 20-fold excess may be employed. Relatively mild temperatures will normally be used, usually being from about 25 to 75° C., preferably from about 45 to 65° C. The mixing may be carried out near or in the presence of a polar solvent such as an alkanol, e.g. methanol. After a sufficient reaction time, usually of the order of 10 minutes to 6 hours, the product can be isolated by any convenient means.

RUST INHIBITION

The compounds used in this invention are found to be excellent rust inhibitors toward ferruginous materials. The compound is introduced into an aqueous medium at concentrations of at least 0.01 weight percent, preferably at least 0.05 weight percent and more preferably at least 0.1 weight percent and generally not in excess of 5 weight percent, preferably not in excess of 2 weight percent.

Other materials may be present in the composition such as alcohols, e.g. methanol, glycols, e.g. ethylene glycol, as well as other additives, such as sealants, fungicides, slimicides, dyes, antioxidants, etc. Usually, the alkanols or glycols will be present in from about 0 to 60 weight percent, more usually from about 0 to 40 weight percent of the aqueous solution. The other additives will normally be present from about 0.001 weight percent to about 1 weight percent individually.

Alternatively, the compounds used in this invention can be prepared as concentrates having from 1 to 60, more usually 1 to 20 weight percent of the additive. The medium may be water or other solvent, preferably ethylene glycol or methanol. Also, they can be introduced into paints, both oil and water based, in amounts of 0.05 to 1 weight percent, where the medium may be water; or a hydrocarbon solvent; an oxygenated organic solvent e.g. ketones, esters, or alkanols; or mixtures thereof.

The additive is effective in aqueous streams, being particularly advantageous where the aqueous stream is continuously recycled. This situation exists in cooling towers, automobile cooling systems, as well as in other systems where a stream is continuously recycled into a hot zone where it absorbs heat and then is moved to a cooling zone where it dissipates the heat.

CROSS-LINKING AND CURING AGENT

The diamine diamides of the subject invention can be used with a wide variety of epoxy and isocyanate based polymers. See U.S. Pat. No. 3,326,853 for a thorough discussion of epoxy resins. The epoxides which find use can be based on epichlorohydrin, bis(4-hydroxyphenyl)-dimethylmethane reaction product with epichlorohydrin, diglycidyl ethers, the reaction product of epichlorohydrin with resorcinol, hydroquinone, or pyrocatechol, etc. Alternatively, glycidyl esters may be employed such as glycidyl esters of phthalic acid, succinic acid, pimelic acid, etc. Glycidyl ethers of polyethylene glycols may also be employed.

The polyureas or polyurethanes can be based on toluene diisocyanate, benzene diisocyanate, Pappi, etc. The prepolymer may be formed with glycols or diamines such as ethylene glycol, propylene glycol, diethylene glycol, bisphenol, or mixes thereof; ethylene diamine, hexamethylene diamine, phenylene diamine, etc.

The amino amides employed in this invention would generally be used in at least a 10 weight percent and not more than about 50 weight percent normally from about 20 to 40 weight percent. At room temperature, with epoxides, pot lives of 7 days or longer can be achieved, while a product will cure rapidly, within a few minutes, at about 90° C. or above. The resulting product is equal or superior to the products of the prior art. Preferably, the terephthalamide will be used, the isophthalamide providing only a relatively short pot life.

The epoxides will normally have epoxide equivalents of at least about 100 and normally not more than about 5,000, usually in the range of about 125 to 4,000.

The following examples are offered by way of illustration and not by way of limitation.

EXAMPLE I

Into a reaction flask was introduced 97 grams (0.5 mol) of dimethyl terephthalate and 360 grams (6.0 mols) of ethylene diamine and the solution mixed. After stirring for 10 minutes, 90 grams of methanol was added and the temperature rose to approximately 40° C. The mixture is then heated to 55° C. until complete solution is obtained (approximately 15 minutes), following which the solution is cooled to about room temperature (24° C.) in approximately 30 minutes.

After allowing the mixture to stand overnight, during which time a precipitate forms, 400 ml. of methanol are added with stirring and the temperature raised 40° C. The mixture is then vacuum filtered, the precipitate rinsed repeatedly with methanol and the methanol fractions combined. After removing the volatiles in vacuo at a temperature of about 70–80° C., the residue which still contains unreactive ethylenediamine, is triturated with toluene (approximately 300–400 ml.). The solid is then filtered, dried in a vacuum oven of at least 70° C. Yield: 75 percent.

The above product was combined in an amount of 25–35 weight percent with an epoxy resin having an equivalent weight of 175–185. A pot life greater than 7 days at 24° C. was observed. However, at about 93° C., the epoxide resin cured in about 2 to 3 minutes.

EXAMPLE II

Following the procedure of Example I, except that 1,2-diaminopropane was substituted for ethylene diamine, a diaminodiamide was obtained having a melting point of 168–172° C. The diamine showed the same desirable pot life in curing properties as the diamine of Example I.

EXAMPLE III

Following the procedure of Example I, except that propylenediamine was substituted for ethylenediamine, a product was obtained having a melting point in the range of 163–167° C. This product also showed the same desirable pot life and curing time as the product of Example I.

EXAMPLE IV

Following the procedure of Example I, except that dimethylisophthalate was substituted for dimethylterephthalate, a product was obtained which was a viscous syrup. While this product did not show the same pot life of the terephthalic analogs, it did show excellent properties as a curing agent.

In order to demonstrate the excellent effectiveness of the composition of this invention as rust inhibitors, the following test was carried out. Three test solutions were employed, one containing only tap water, one containing 0.1 weight percent of the product of Example I, and one containing 1 weight percent of the product of Example I, and a common box nail (2.5 inches long) introduced into each of the flasks. Approximately an inch of the box nail was immersed in the water. The flasks were allowed to stand at room temperature. Within 24 hours, rust was observed in the control flask and after several days, the rusting was very heavy. After two years, the flask containing 1 weight percent of the product of Example I showed no sign of rusting, the nails being as bright and clean as at the initiation of the test. With 0.1 weight percent of the product of Example I, a trace of rust was observed at the bottom of the flask, but the nails remained bright and clean.

It is evident from the above results, that the diaminodiamides employed in the subject invention have a wide variety of important uses. They can be used as curing agents and as cross-linking agents, the terephthalamides being particularly useful in providing temperature controlled curing. Also, the compounds of this invention can be used as water soluble rust inhibitors in boilers, cooling systems, antifreeze compositions, paints, etc.

What is claimed is:

1. A method of curing or cross-linking a poly(1,2-epoxy resin) which comprises combining the poly(1,2-epoxy resin) with from 10 to 50 weight percent based on resin of a compound of the formula:

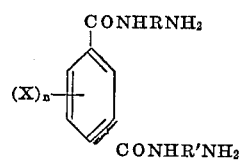

wherein R and $R^1$ are alkylene of from 2 to 3 carbon atoms, there being two carbon atoms of the alkylene group between the nitrogen atoms the two nonoxocarbonyl groups being separated by at least three annular carbon atoms (meta or para), X is halogen or alkyl of from 1 to 4 carbon atoms, and $n$ is an integer of from 0 to 2.

2. A method according to claim 1, wherein the carboxamides are para and $n$ is 0.

3. A method according to claim 2, wherein R and R' are ethylene.

4. A method according to claim 1, wherein R and R' are propylene.

5. A method according to claim 1, wherein the compound of the formula is employed in from 20 to 40 weight percent of the resin.

References Cited
UNITED STATES PATENTS

| | | | |
|---|---|---|---|
| 2,371,104 | 3/1945 | Kienle et al. | 260—558 X |
| 3,183,198 | 5/1965 | Wagner | 260—47 X |

WILLIAM H. SHORT, Primary Examiner

T. E. PERTILLA, Assistant Examiner

U.S. Cl. X.R.

21—2.5, 2.7; 106—14; 252—77, 392; 260—2 N, 77.5 CH, 77.5 AQ, 78.4 EP